United States Patent [19]

Ho et al.

[11] Patent Number: 5,535,368
[45] Date of Patent: Jul. 9, 1996

[54] AUTOMATICALLY-CONFIGURING MEMORY SUBSYSTEM

[75] Inventors: Wen-Jei Ho, Los Gatos, Calif.; Michael J. Stember, Raleigh; Steven L. Vanderlinden, Chapel Hill, both of N.C.

[73] Assignee: International Business Machines Corporation, Armonk, N.Y.

[21] Appl. No.: 380,228

[22] Filed: Jan. 30, 1995

Related U.S. Application Data

[63] Continuation of Ser. No. 790,992, Nov. 12, 1991, abandoned.

[51] Int. Cl.[6] ........................................... G06F 12/06
[52] U.S. Cl. ........................ 395/497.01; 395/497.02; 395/497.03
[58] Field of Search ..................... 395/497.01, 497.02, 395/497.03

[56] References Cited

U.S. PATENT DOCUMENTS

| | | | |
|---|---|---|---|
| 4,303,993 | 12/1981 | Panepinto, Jr. et al. | 365/230.03 |
| 4,609,996 | 9/1986 | Kummer | 395/425 |
| 4,727,475 | 2/1988 | Kiremidjian | 395/325 |
| 4,744,025 | 5/1988 | Lipcon et al. | 395/425 |
| 4,797,850 | 1/1989 | Amitai | 395/425 |
| 4,926,314 | 5/1990 | Dhuey | 395/425 |
| 4,926,322 | 5/1990 | Stimae et al. | 395/500 |
| 4,931,923 | 6/1990 | Fitch et al. | 395/500 |
| 4,951,248 | 8/1990 | Lynch | 395/425 |
| 5,012,408 | 4/1991 | Conroy | 395/425 |

OTHER PUBLICATIONS

IBM Technical Disclosure Bulletin, vol. 31, No. 12, May, 1989 "A Dynamic Self-Configuration Memory or Memory Card Arrangement"0.

*Primary Examiner*—Reba I. Elmore
*Attorney, Agent, or Firm*—Stephen T. Keohane

[57] ABSTRACT

A self-configuring memory subsystem for a computer system allows the insertion of memory modules into any of the available expansion sockets without the need for setting switches or inserting the modules in a predefined or restricted sequence and without the requirement of additional logic circuitry or microcode in the computer. Each of the memory modules utilized with the subsystem has a number of size identification bits, each bit being connected to a known value, such as ground or left floating. The size bits are detected by logic circuitry embodied in a programmable logic device (PLD) so that the total memory space may be properly mapped. The PLD is programmed so that it uses the identification bits to "map" the installed memory modules into the logical memory address space as accessed by the memory controller so that each memory location of the memory modules has an allocated memory location without addressing ambiguities.

8 Claims, 4 Drawing Sheets

FIG. 2

| SIMM_SIZE 0 | SIMM_SIZE 1 | MEMORY SIZE (MEGABYTE) |
|---|---|---|
| 1 | 1 | NO MEMORY INSTALLED |
| 1 | 0 | 1.0 |
| 0 | 1 | 2.0 |
| 0 | 0 | 4.0 |

FIG. 3

| MEG | A09 | A10 | A11 | A12 |
|---|---|---|---|---|
| 0.5 | 0 | 0 | 0 | 0 |
| 1.0 | 0 | 0 | 0 | 1 |
| 1.5 | 0 | 0 | 1 | 0 |
| 2.0 | 0 | 0 | 1 | 1 |
| 2.5 | 0 | 1 | 0 | 0 |
| 3.0 | 0 | 1 | 0 | 1 |
| 3.5 | 0 | 1 | 1 | 0 |
| 4.0 | 0 | 1 | 1 | 1 |
| 4.5 | 1 | 0 | 0 | 0 |
| 5.0 | 1 | 0 | 0 | 1 |
| 5.5 | 1 | 0 | 1 | 0 |
| 6.0 | 1 | 0 | 1 | 1 |
| 6.5 | 1 | 1 | 0 | 0 |
| 7.0 | 1 | 1 | 0 | 1 |
| 7.5 | 1 | 1 | 1 | 0 |
| 8.0 | 1 | 1 | 1 | 1 |

AUTOMATICALLY-CONFIGURING MEMORY SUBSYSTEM

This application is a continuation, of application Ser. No. 07/790,992, filed Nov. 12,1991, now abandoned.

BACKGROUND OF THE INVENTION

I. Field of the Invention

The invention relates generally to memory systems in computers. More particularly, the invention relates to an automatically-configuring memory subsystem for use with a computer wherein pluggable memory cards or modules of any memory size may be plugged into any of the allocated sockets of the computer and the system will automatically self-configure with respect to the memory.

II. Prior Art

Modern computer systems typically have provisions for expanding internal memory. For example, it is common to have "expansion slots" within the chassis of the computer into which memory boards may be inserted. Such memory boards are typically printed circuit boards (PCBs) populated with an array of semiconductor memory chips. Alternatively, the expansion memory can take the form of memory modules insertable in memory expansion sockets within the computer system. In order for the central processing unit (CPU) of the computer to store and retrieve data in such an expandable memory, the CPU must know the total size of the memory available. Furthermore, the total memory space must be configured such that there are no addressing ambiguities.

In many computer systems with expandable memories, a set of switches internal to the computer must be set to indicate the memory size whenever memory modules are inserted or removed. It is not uncommon for a technician or user to forget to set the switches when changing the memory size or to place such switches in the wrong position. In either case, the CPU receives erroneous information as to memory size and, consequently, the computer may be unable to properly address the memory. A customer who improperly sets the switches may never obtain the benefits of the extra memory capacity.

In other systems, the CPU senses the presence of a memory module without the requirement for switch-setting. This is typically limited to determining whether or not a predetermined memory option has been installed. Such systems are not capable of accommodating memory modules of arbitrary size that may be inserted in any one or more of several sockets.

In still other systems, logic circuitry is mounted on each expansion memory board for providing the remaining memory boards with signals indicating the respective sizes of the memories. The logic circuitry on each board then calculates the total memory, the total memory consisting of the CPU base memory, any expansion memory between the CPU base memory and that expansion memory board, and the memory resident on that expansion memory board. This value is then passed on to an adjacent expansion memory board in daisy-chain fashion. Such a system is described in detail in Lynch, U.S. Pat. No. 4,951,248. In such a system, the logic circuitry on each board requires additional board space, and increases costs and manufacturing time.

A solution to this problem is discussed in IBM Technical Disclosure Bulletin, Vol. 31, No. 12 of May, 1989, wherein an arrangement for supporting four memory card slots is described. Each slot could have a 0.5 megabyte (0.5 MB) card or a 2 megabyte (2 MB) card installed. Two wires from each memory card indicate whether a card is installed in the card slot and whether the card is a 0.5 MB or a 2 MB card. One wire is grounded on the memory card to indicate that the card is installed while the other wire is grounded or left floating to indicate the card size. The two wires are inputs to registers resident in the personal computer. The registers can be read by a microprocessor having microcode so that the computer will know the memory allocation. The use of this arrangement, however, requires allocation of microprocessor processing time, as well as programming and debugging of the microcode.

SUMMARY OF THE INVENTION

The present invention provides a self-configuring memory subsystem for a computer system such as, for example, a personal computer. The invention allows the insertion of memory modules into any of the available expansion sockets without the need for setting switches or inserting the modules in a predefined or restricted sequence. In addition, the present invention provides a memory system without the requirement of additional logic circuitry on the memory cards or microcode in the computer.

The invention comprises a system having a number of expansion sockets for additional memory modules. The memory modules can be of any size, although memory modules are normally available in 0.5 megabyte (MB), 1 MB, 2 MB and 4 MB sizes. Each of the memory modules has a number of identification bits, each bit either being connected to a known value, such as ground, or left floating. The size bits are detected by logic so that the total memory space may be properly mapped.

In the preferred embodiment, a programmable logic device (PLD), a device which can be programmed to perform logic functions, is utilized to detect the size bits for mapping the memory. The PLD is programmed so that the memory module identification bits are utilized to inform the control circuitry of the particular socket location in which a particular expansion memory module is inserted. After the location and size of the available memory is determined, the PLD uses the identification bits to "map" the installed memory modules into the logical memory address space as accessed by the memory controller. For example, if three memory modules are installed in the computer, the first memory location of the first memory module is assigned the lowest logical starting address following the highest logical address of the CPU base memory. The last memory location of the last memory module is assigned the highest logical memory address. In this manner, each memory location of the memory modules has an allocated memory location without addressing ambiguities.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the following technical description when read in conjunction with the accompanying drawings, where:

FIG. 2 is a table showing the logic for determining the memory size of each memory module.

FIG. 3 is a table indicating the logic for determining the addressed memory location by the CPU.

DETAILED DESCRIPTION OF THE PREFERRED EMBODIMENT

In a computer system, the central processing unit (CPU) base memory and the expansion memories may each have a variety of independent configurations. Because the CPU operates as if there is a single contiguous memory space, the CPU base memory and the expansion memory must be properly mapped so that all of the memory capacity may be utilized without having addressing ambiguities. The base and expansion memories are mapped so that the single contiguous memory space begins with the base memory and continues through the memory space of the successive expansion memory modules or boards. The configurable memory subsystem of the present invention provides a self-configuring memory without the need for setting switches or inserting the modules in a predefined or restricted sequence and without the requirement of additional logic circuitry on the memory cards or microcode in the computer.

Figure 1:
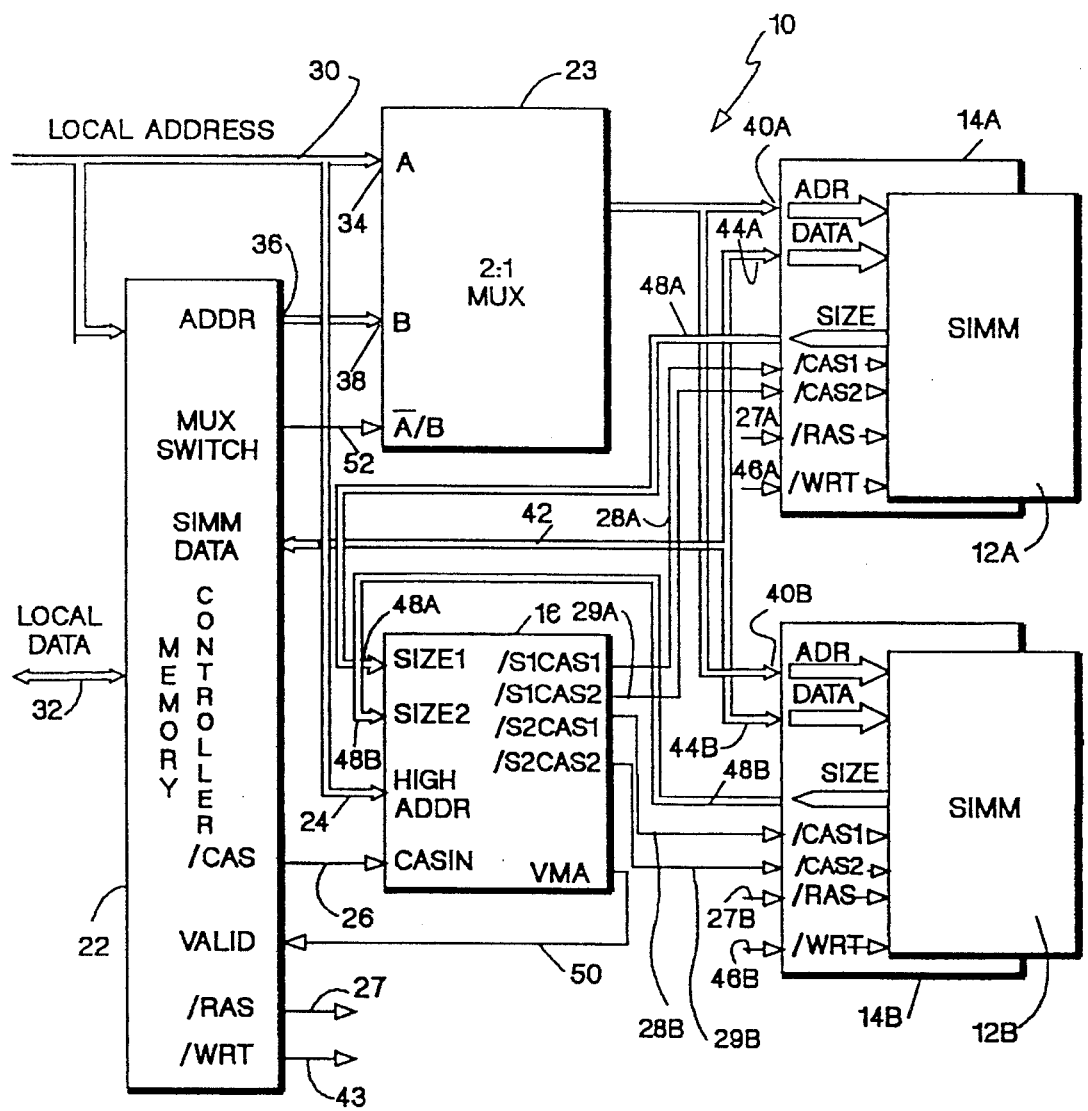
FIG. 1 is a block diagram representation of the configurable memory subsystem of the present invention.

Referring now to the figures, FIG. 1 illustrates in block diagram form the configurable memory subsystem 10 of the present invention. The configurable memory subsystem comprises a plurality of module sockets 14A, 14B into which memory modules 12A, 12B are inserted. The module sockets 14A, 14B may be located, for instance, in a computer chassis having a number of expansion memory sockets. For clarity and simplicity, only two module sockets 14A, 14B and two memory modules 12A, 12B are shown although any number of sockets and modules may be utilized. The memory modules 12A, 12B provide memory for the computer system in addition to the base memory physically associated with central processing unit (CPU).

The configurable memory subsystem further comprises a programmable logic device (PLD) 16 connected to sockets 14A, 14B for properly controlling the addressing of the memory modules. As is well-known in the art, a PLD is a device which has a number of inputs and outputs and may be programmed to perform a multiplicity of logical functions with respect to the inputs and outputs.

Connected to the PLD is a memory controller 22. The memory controller, which is also connected to the local address and data buses, provides such functions as gating addresses and data to and from the memory modules. A 2:1 multiplexer (MUX) 23 is utilized to multiplex the appropriate address to the memory modules 12A and 12B.

In the present embodiment, memory modules 12A, 12B are dynamic random access memory (DRAM) single in-line memory modules (SIMMs). Other memory module types, such as static random access memories (SRAMs), may also be utilized. Hereinafter, memory modules 12A, 12B are referred to as SIMM 12A and SIMM 12B, respectively. Each SIMM 12A, 12B provides one or more bits of data at SIZE output 48A, 48B indicating to the PLD 16 the memory size of the particular SIMM. The number of SIZE bits required is, consequently, a function of the number of different-sized SIMMs which may be accommodated by the subsystem 10.

In order to access a particular memory location in the particular SIMM, both row and column addresses must be provided. This is accomplished by providing a particular address at the ADR input (40A, 40B) and signalling to the SIMM that it is a row address (via a RAS signal) or that it is a column address (via a CAS signal). The addresses are provided by 2:1 MUX 23.

In the present embodiment, a single, repowered RAS line is sent to both SIMMs. In the present embodiment, however, each SIMM memory has two addressable "sides". Thus, to select each side uniquely, a unique CAS line is generated by the PLD for each side of each of the two SIMMs. Thus, four column outputs /S1CAS1, /S1CAS2, /S2CAS1, and /S2CAS2 are required from the PLD 16 where /S1CAS1 indicated by the numeral 28A represents the column enable line for the first side of SIMM 12A and /S1CAS2 indicated by the numeral 29A represents the column enable line for the second side of SIMM 12A. Similarly, /S2CAS1 28B and /S2CAS2 29B represent the column enable lines for the first and second sides of SIMM 12B. The four column enable lines /S1CAS1, /S1CAS2, /S2CAS1, and /S2CAS2 are input to the SIMMs at /CAS1 and /CAS2.

A WRT signal 43 is provided by the memory controller 22 for indicating to SIMMs 12A, 12B whether the data on data bus 42 is to be written into or read out of the SIMMs at DATA pins 44A, 44B. The WRT signal 43 is routed to inputs 46A, 46B of SIMMs 12A, 12B.

The configurable memory subsystem 10 operates as follows. A local address bus 30 and a local data bus 32 are connected to the subsystem 10 from the computer's CPU (not shown). The local data bus 32 is connected directly to the memory controller 22 for gating to the expansion memory modules. The local address bus 30 is connected to the memory controller 22, the "A" input 34 of the 2:1 MUX 23, and the PLD 16. The PLD 16 requires only the high order bits 24 of address bus 30. ADDR output 36 of the memory controller 22 is connected to the "B" input 38 of the 2:1 MUX 23. The 2:1 MUX 23 is utilized to multiplex either the row address (at input "A" 34) or the column address (at input "B" 38) to each SIMM at address input 40A, 40B, respectively.

When data is to be transferred to the expansion memory modules 12A, 12B, i.e., when the memory address is greater than the addressable memory in the CPU base memory, the memory controller 22 gates the data onto the SIMM data bus 42 for being strobed into either of the SIMMs 12A, 12B. A MUX SWITCH line 52 from the memory controller 22 toggles the 2:1 MUX output between the row and column addresses.

The control lines to the particular SIMM are enabled by the PLD 16. In particular, the PLD 16 is programmed so that the high order address bits of the local address bus 30 and the SIZE data of each of the SIMMs 12A, 12B is used to determine which of the SIMMs is to be selected. More specifically, the PLD 16 looks at the SIZE data to determine the amount of memory installed, and begins assigning addresses to SIMM 12A starting at the logical address equal to the size of the CPU base memory. The highest address assigned to the SIMM 12A memory is equal to the size of SIMM 12A plus the size of the CPU base memory minus one. No addresses are assigned if no SIMM is installed in socket 14A.

The PLD 16 then looks at the SIZE bits from SIMM 12B and begins assigning addresses immediately following the highest address assigned to SIMM 12A. The highest address of SIMM 12B is the sum of the memory sizes of the CPU base memory, SIMM 12A and SIMM 12B minus one.

This logic is expandable to include any number of sockets as the starting address for the next segment of memory is the sum of the sizes of the CPU base memory and all preceding SIMMs. The ending address of any SIMM is the sum of the CPU base memory size and all preceding SIMM sizes plus the SIMM size in question minus one.

As the addresses are received by the memory controller 22, the multiplexed addresses, memory data, RAS, CAS and WRT signals are generated to control the access to the SIMMs, as is well known in the art.

As was indicated above, the PLD 16 receives the high order address bits 24. The PLD 16 uses the high order address bits to "index" into the memory addresses assigned to each SIMM. The single CAS control signal 26 generated by the memory controller 22 is then routed by the PLD 16 to the appropriate socket, based on the predetermined indexing. A Valid Memory Address (VMA) signal 50 is asserted back to the memory controller to indicate a valid address range.

If high order address bits presented by the system do not match any of the addresses occupied by the installed memory, the VMA signal 50 is not asserted. This communicates to the controller 22 that it has attempted to address memory outside the installed range. The memory access continues, based upon the design of the controller 22.

Although the invention may be used where any number memory modules may inserted and where modules having a great variety of memory sizes may be used, the present embodiment as an example and for simplicity illustrates two memory modules inserted in the subsystem sockets. In addition, the logic of the PLD 16 has been determined where four high order address bits (A09, A10, A11 and A12) are input to the PLD and where four size bits (SIMM12A_SIZE0, SIMM12A_SIZE1, SIMM12B_SIZE0 and SIMM12B_SIZE1), two size bits from each SIMM 12A, 12B, are input to the PLD. Because of the limitation on the number of address and size bits in the present example, the SIMMs may be one of three memory sizes. In the present example, the available sizes are 1 MB, 2 MB and 4 MB.

FIGS. 2 and 3 illustrate, in a logical map form, the size of a SIMM indicated by the size bits SIMM_SIZE0 and SIMM_SIZE1 (corresponding to the four size bits SIMM12A_SIZE0, SIMM12A_SIZE1, SIMM12B_SIZE0 and SIMM12B_SIZE1), and the memory location addressed corresponding to high order address bits A09, A10, A11, and A12. For instance, in FIG. 2, where SIMM_SIZE0 is high (indicated by the numeral 1) and SIMM_SIZE1 is low (indicated by the numeral 0), the respective SIMM is 1 MB. In FIG. 3, as an example, where A09 is low, A10 is high, A11 is low and A12 is low, the portion of expansion memory being addressed is the portion of memory 2.0 to 2.5 MB greater than the CPU base memory size. The low order address bits are routed to the particular SIMM for row and column information.

Table 1, shown below, illustrates the Boolean equations which define the logic programmed in the PLD. As can be seen in Table 1, four outputs —SIDE1A_EN, —SIDE1B_EN, —SIDE2A_EN, and —SIDE2B_EN are logically defined by the equations. Two of these outputs —SIDE1A_EN and —SIDE1B_EN correspond /S1CAS1 and /S1CAS2 of FIG. 1. The /S1CAS1 and /S1CAS2 signals are the enable lines for the two sides of SIMM 12A and are represented by the numerals 28A and 29A, respectively, in FIG. 1. The remaining two outputs, —SIDE2A_EN and —SIDE2B_EN, in a similar manner, correspond /S2CAS1 and /S2CAS2 of FIG. 1. The /S2CAS1 and /S2CAS2 signals, similarly, are the enable lines for the two sides of SIMM 12B and are represented by the numerals 28B and 29B, respectively, in FIG. 1. As was discussed above, the outputs are a function of the high order address bits (A09, A10, A11 and A12) and the SIMM size bits (SIMM12A_SIZE0, SIMM12A_SIZE1, SIMM12B_SIZE0 and SIMM12B_SIZE1). The remaining symbols in the equations are defined as follows:

& =AND;

+=OR; and

−=INVERT (or COMPLEMENT).

TABLE 1

| | |
|---|---|
| −SIDE1A_EN= | (SIMM12A_SIZE0 & −SIMM12A_SIZE1 & −A9 & −A10 & −A11 & −A12) |
| | + (−SIMM12A_SIZE0 & −A9 & −A10) |
| −SIDE1B_EN= | (SIMM12A_SIZE0 & −SIMM12A_SIZE1 & −A9 & −A10 & −A11 & A12) |
| | + (−SIMM12A_SIZE0 & −SIMM12A_SIZE1 & −A9 & A10) |
| −SIDE2A_EN= | (SIMM12A_SIZE0 & SIMM12A_SIZE1 & SIMM12B_SIZE0 & −SIMM12B_SIZE1 & −A9 & −A10 & −A11 & −A12) |
| | + (SIMM12A_SIZE0 & SIMM12A_SIZE1 & −SIMM12B_SIZE0 & −A9 & −A10) |
| | + (SIMM12A_SIZE0 & −SIMM12A_SIZE1 & SIMM12B_SIZE0 & −SIMM12B_SIZE1 & −A9 & −A10 & A11 & −A12) |
| | + (SIMM12A_SIZE0 & −SIMM12A_SIZE1 & −SIMM12B_SIZE0 & −A9 & −A10 & A11) |
| | + (SIMM12A_SIZE0 & −SIMM12A_SIZE1 & −SIMM12B_SIZE0 & −A9 & A10 & −A11) |
| | + (−SIMM12A_SIZE0 & SIMM12A_SIZE1 & SIMM12B_SIZE0 & −SIMM12B_SIZE1 & −A9 & A10 & −A11 & −A12) |
| | + (−SIMM12A_SIZE0 & SIMM12A_SIZE1 & −SIMM12B_SIZE0 & −A9 & A10) |
| | + (−SIMM12B_SIZE0 & −SIMM12A_SIZE1 & SIMM12B_SIZE0 & −SIMM12B_SIZE1 & A9 & −A10 & −A11 & −A12) |
| | + (−SIMM12A_SIZE0 & −SIMM12A_SIZE1 & −SIMM12B_SIZE0 & A9 & −A10) |
| −SIDE2B_EN= | (SIMM12A_SIZE0 & SIMM12A_SIZE1 & SIMM12B_SIZE0 & −SIMM12B_SIZE1 & −A9 & −A10 & −A11 & A12) |
| | + (SIMM12A_SIZE0 & SIMM12A_SIZE1 & −SIMM12B_SIZE0 & SIMM12B_SIZE1 & −A9 & A10) |
| | + (SIMM12A_SIZE0 & −SIMM12A_SIZE1 & SIMM12B_SIZE0 & −SIMM12B_SIZE1 & −A9 & −A10 & A11 & A12) |
| | + (SIMM12A_SIZE0 & −SIMM12A_SIZE1 & −SIMM12B_SIZE0 |

TABLE 1-continued

```
& –SIMM12B_SIZE1 & A9 & –A10 & –A11)
+ (SIMM12A_SIZE0 & –SIMM12A_SIZE1 & –SIMM12B_SIZE0
& –SIMM12B_SIZE1 & –A9 & A10 & A11)
+ (–SIMM12A_SIZE0 & SIMM12A_SIZE1 & SIMM12B_SIZE0 &
–SIMM12B_SIZE1 & –A9 & A10 & –A11 & A12)
+ (–SIMM12A_SIZE0 & SIMM12A_SIZE1 & –SIMM12B_SIZE0
& –SIMM12B_SIZE1 & A9 & –A10)
+ (–SIMM12A_SIZE0 & –SIMM12A_SIZE1 & SIMM12B_SIZE0
& –SIMM12B_SIZE1 & A9 & –A10 & –A11 & A12)
+ (–SIMM12A_SIZE0 * –SIMM12A_SIZE1 & –SIMM12B_SIZE0
& –SIMM12A_SIZE1 & A9 & A10)
```

Figure 4:
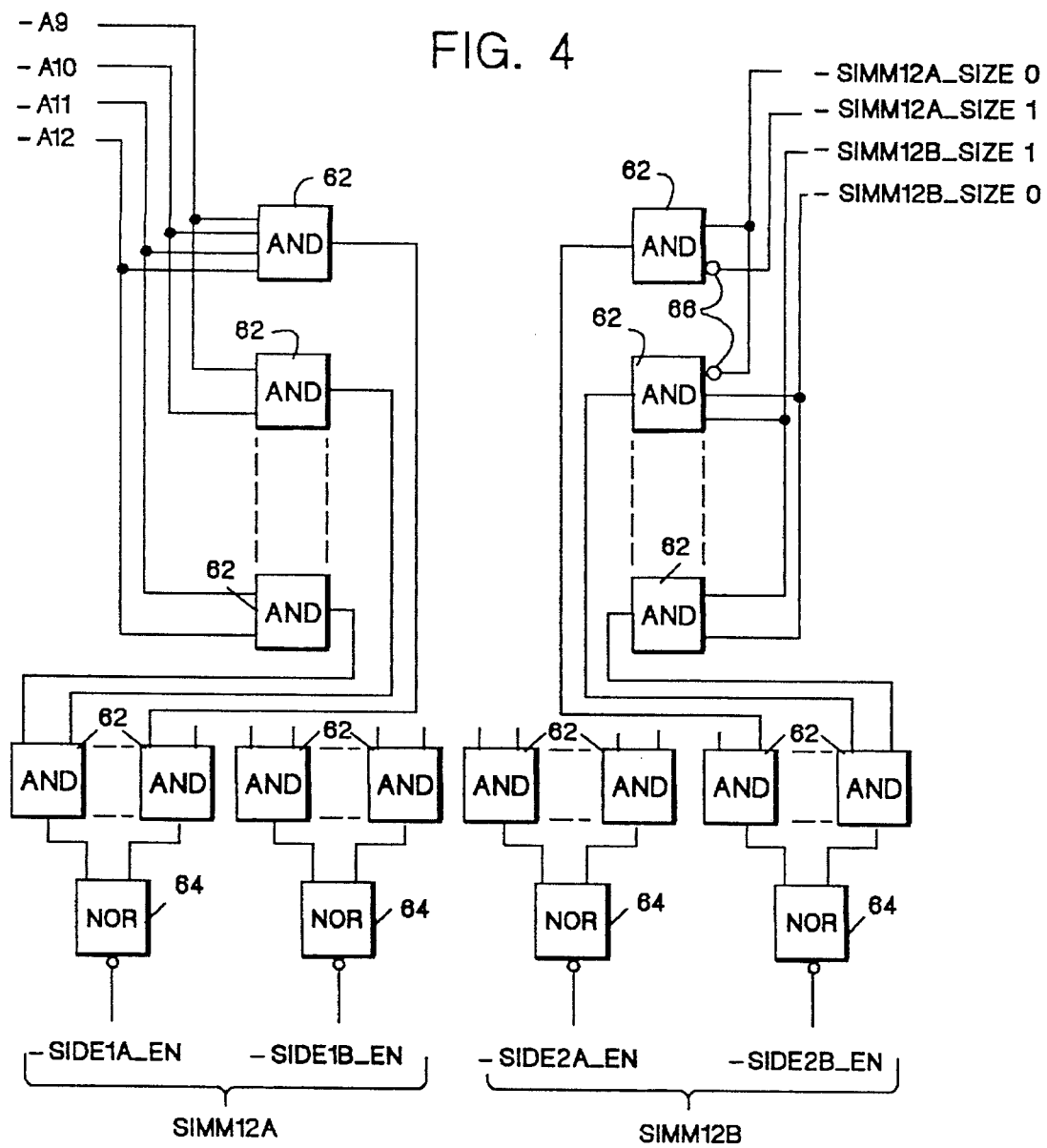
FIG. 4 is a diagram showing the logic of the programmable logic device in schematic form.

The actual logic circuitry is illustrated in schematic form in FIG. 4. As can be seen, the logical circuitry comprises a plurality of AND gates 62 and NOR gates 64 interconnected according to the Boolean equations as shown in Table 1. Because of the complexity of the circuitry when all of the logic is shown, all of the connecting lines between the AND and NOR gates are not illustrated in FIG. 4. In addition, only a portion of the total number of gates is shown, the remaining gates being represented by dashed lines. As can be seen at the upper left corner of FIG. 4, the complement of the four high order address bits A09, A10, A11 and A12 are shown. Similarly, at the upper right corner of FIG. 4, the complement of the four size bits SIMM12A_SIZE0, SIMM12A_SIZE1, SIMM12B_SIZE0 and SIMM12B_SIZE1 are illustrated. As was previously discussed, the address data and the size data are connected to the logic circuitry according to the Boolean equations of Table 1.

Figure 5:
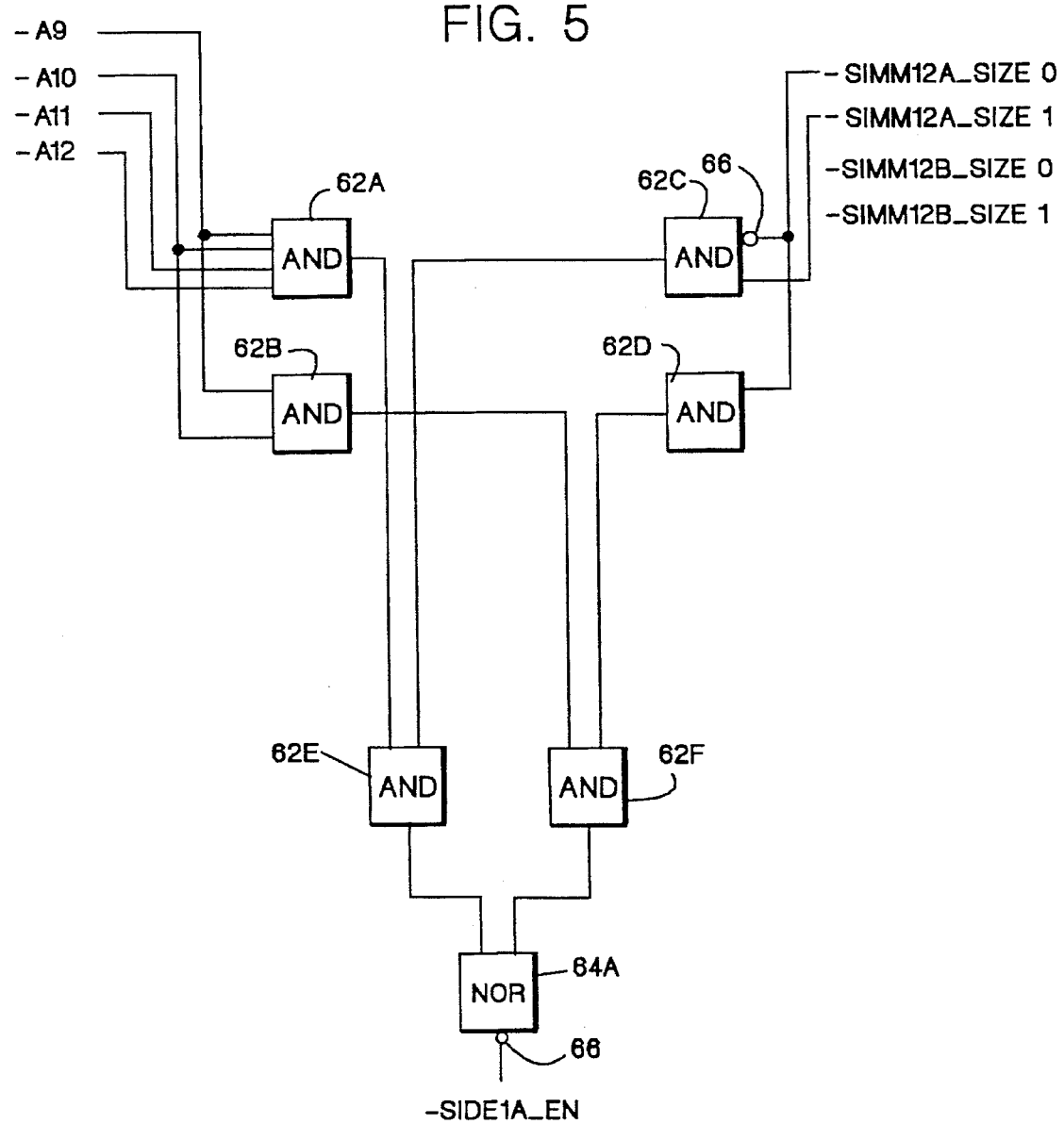
FIG. 5 is a schematic diagram showing the logic of the programmable logic device for a particular output to a memory module.

An example of how the logical circuitry implements the Boolean equations of Table 1 is shown in FIG. 5. FIG. 5 illustrates the logical implementation of the first equation of Table 1 defining —SIDE1A_EN. The logical representation of the remaining equations is similarly implemented.

As can be seen in FIG. 5, as in FIG. 4, the complement of the four high order address bits A09, A10, A11 and A12 are illustrated in the upper left corner of the figure while the complement of the size bits are positioned in the upper right corner. The complement of each of the four address bits A09, A10, A11 and A12 are inputs to AND gate 62A. The output of AND gate 62A comprises the first term of the —SIDE1A_EN equation and is an input to AND gate 62E. SIMM12A_SIZE0 and —SIMM12A_SIZE1 are inputs to AND gate 62C. Circle 66 at the input to AND gate 62C represents an inverter for complementing —SIMM12A_SIZE0. The output of AND gate 62C comprises the second term of the referenced equation and is the second input to AND gate 62E. The complement of address bits A9 and A10 are inputs to AND gate 62B, the output of which represents the third term in the equation and is an input to AND gate 62F. Size bit —SIMM12A_SIZE0 is the sole input to AND gate 62D, the output of which represents the last term of the equation and is the second input to AND gate 62F. Finally, the respective outputs of AND gates 62E and 62F are inputs to NOR gate 64A. The output of NOR gate 64A represents the equation defining —SIDE1A_EN. The remaining equations of Table 1 are similarly logically implemented.

While the invention has been particularly shown and described with reference to preferred embodiments thereof, it will be understood by those skilled in the art that various other changes in form and detail may be made without departing from the spirit and scope of the invention.

What is claimed is:

1. A configurable memory subsystem for use with a computer system having a central processing unit with a memory address output, said configurable memory subsystem comprising:

a plurality of memory devices, each memory device having a size output indicative of its respective memory size;

means for receiving one or more of said memory devices, said memory devices being insertable and removable from said receiving means without intervening said central processing unit;

a programmable logic device (PLD) having inputs for receiving said size outputs, having an input for receiving said memory address output, having means for determining the acceptable range of memory address outputs, providing output indicative as to whether said memory address output is valid, and providing an enabling output for selectively enabling one of said memory devices, said enabling output being based upon said memory address output and upon said size outputs from said memory devices, whereby one of said memory devices may be inserted into said receiving means or may be removed from said receiving means without indicating such insertion or removal to said central processing unit.

2. The configurable memory subsystem as defined in claim 1 wherein said memory devices are dynamic random access memories, each memory location of said dynamic random access memories having a row address and a column address.

3. The configurable memory configurable memory subsystem as defined in claim 2 wherein said memory address output comprises a row address and a column address and said subsystem further comprises a multiplexer connected to said dynamic random access memories for receiving said row address and said column address and for multiplexing said row address and said column address to said dynamic random access memories.

4. A configurable memory subsystem for use with a computer system having a central processing unit with a memory address output, said computer system having means for receiving a plurality of memory devices, said memory devices being insertable and removable from said receiving means without intervening said central processing unit, each memory device having a size output indicative of its respective memory size, said configurable memory subsystem comprising a programmable logic device (PLD) having inputs for receiving said size outputs, having an input for receiving said memory address output, having means for determining the acceptable range of memory address outputs, providing output indicative as to whether said memory address output is valid, and providing an enabling output for selectively enabling one of said memory devices, said enabling output being based upon said memory address output and upon said size outputs from said memory devices, whereby one of said memory devices may be inserted into said receiving means or may be removed from said receiving means without indicating such insertion or removal to said central processing unit.

5. A computer system comprising:

a central processing unit with a memory address output;

a plurality of memory devices, each memory device having a size output indicative of its respective memory size;

means for receiving one or more of said memory devices, said memory devices being insertable and removable from said receiving means without intervening said central processing unit;

a programmable logic device (PLD) having inputs for receiving said size outputs, having an input for receiving said memory address output, having means for determining the acceptable range of memory address outputs, providing output indicative as to whether said memory address output is valid, and providing an enabling output for selectively enabling one of said memory devices, said enabling output being based upon said memory address output and upon said size outputs from said memory devices, whereby one of said memory devices may be inserted into said receiving means or may be removed from said receiving means without indicating such insertion or removal to said central processing unit.

6. The computer system as defined in claim 5 wherein said memory devices are dynamic random access memories, each memory location of said dynamic random access memories having a row address and a column address.

7. The computer system as defined in claim 6 wherein said memory address output comprises a row address and a column address and said subsystem further comprises a multiplexer connected to said dynamic random access memories for receiving said row address and said column address and for multiplexing said row address and said column address to said dynamic random access memories.

8. A circuit card for use with a computer system comprising a central processing unit with a memory address output, said circuit card comprising a configurable memory having a plurality of memory devices, each memory device having a size output indicative of its respective memory size, means for receiving one or more of said memory devices, said memory devices being insertable and removable from said receiving means without intervening said central processing unit, and a programmable logic device (PLD) having inputs for receiving said size outputs, having an input for receiving said memory address output, having means for determining the acceptable range of memory address outputs, providing output indicative as to whether said memory address output is valid, and providing an enabling output for selectively enabling one of said memory devices, said enabling output being based upon said memory address output and upon said size outputs from said memory devices, whereby one of said memory devices may be inserted into said receiving means or may be removed from said receiving means without indicating such insertion or removal to said central processing unit.

* * * * *